(12) United States Patent
Isozaki et al.

(10) Patent No.: US 6,259,176 B1
(45) Date of Patent: *Jul. 10, 2001

(54) MULTI-PHASE OUTER-TYPE PM STEPPING MOTOR

(75) Inventors: Kouki Isozaki, Kiryu; Naotugu Sato; Yuuichi Tsuda, both of Kasakake-machi; Junji Rokunohe, Kiryu; Ayako Shimura, Nitta-machi, all of (JP)

(73) Assignee: Japan Servo Co., LTD, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,917

(22) Filed: Jan. 28, 1999

(30) Foreign Application Priority Data

Feb. 6, 1998 (JP) .................................................. 10-039776

(51) Int. Cl.[7] .......................... H02K 37/00; H02K 11/00; H02K 19/00; H02K 1/12

(52) U.S. Cl. ..................... 310/49 R; 310/68 R; 310/162; 310/257

(58) Field of Search ............................. 310/49 R, 49 A, 310/68 R, 114, 152, 153, 156, 162, 179, 254, 257, 159, 165

(56) References Cited

U.S. PATENT DOCUMENTS

| | | | |
|---|---|---|---|
| 3,549,918 | * 12/1970 | Croymans et al. | 310/49 R |
| 3,599,069 | 8/1971 | Welch | 318/696 |
| 3,806,744 | * 4/1974 | Abraham et al. | 310/49 R |
| 3,950,663 | * 4/1976 | Mead | 310/49 R |
| 4,206,374 | 6/1980 | Goddijn | 310/49 R |
| 4,347,457 | 8/1982 | Sakamoto | 310/256 |
| 4,384,226 | 5/1983 | Sato et al. | 310/89 |
| 4,406,958 | * 9/1983 | Palmero et al. | 310/49 R |
| 4,499,391 | 2/1985 | Sakamoto | 310/89 |
| 4,503,368 | 3/1985 | Sakamoto | 310/49 R |
| 4,607,204 | * 8/1986 | Setoya | 318/696 |
| 4,672,253 | 6/1987 | Tajima et al. | 310/269 |
| 4,675,564 | 6/1987 | Isozaki | 310/49 R |
| 4,764,697 | 8/1988 | Christiaens | 310/49 R |
| 4,983,867 | 1/1991 | Sakamoto | 310/49 R |
| 5,032,747 | 7/1991 | Sakamoto | 310/49 R |
| 5,128,570 | 7/1992 | Isozaki | 310/49 R |
| 5,243,246 | 9/1993 | Sakamoto | 310/179 |
| 5,289,064 | 2/1994 | Sakamoto | 310/49 R |
| 5,321,340 | 6/1994 | Tamaki et al. | 318/696 |
| 5,386,161 | 1/1995 | Sakamoto | 310/49 R |
| 5,410,200 | 4/1995 | Sakamoto et al. | 310/49 R |
| 5,780,944 | 7/1998 | Sakamoto | 310/49 R |
| 5,854,526 | 12/1998 | Sakamoto | 310/254 |
| 5,942,828 | * 8/1999 | Hill | 310/164 |

* cited by examiner

*Primary Examiner*—Nestor Ramirez
*Assistant Examiner*—Guillermo Perez
(74) *Attorney, Agent, or Firm*—Oblon, Spivak, McClelland, Maier & Neustadt, P.C.

(57) ABSTRACT

A multi-phase outer-type permanent magnet stepping motor including a rotor constituted by a cylindrical permanent magnet assembly in which N (north) and S (south) poles are magnetized alternately on an inner circumferential surface of the rotor. Stator cores respectively having pole teeth disposed in opposition to the N or S poles of the rotor through a predetermined gap. Further, excitation coils are wound in the stator cores for magnetizing the stator cores to thereby rotate the rotor such that, when a number of the stator cores is 3 and the magnetization pitch of the permanent magnet assembly is P, pole teeth of the stator cores are arranged so that the pole teeth of one stator core is shifted by an angle of 2P/3 from the pole teeth of an adjacent stator core.

8 Claims, 16 Drawing Sheets

FIG. 17

| M | τr | $\theta s = \frac{1}{6} \tau r$ |
|---|---|---|
| 2 | 360° | 60° |
| 4 | 180° | 30° |
| 6 | 120° | 20° |
| 8 | 90° | 15° |
| 10 | 72° | 12° |
| 12 | 60° | 10° |
| 14 | 51.43° | 8.57° |
| 16 | 45° | 7.5° |
| 18 | 40° | 6.66° |
| 20 | 36° | 6° |
| 22 | 32.73° | 5.45° |
| 24 | 30° | 5° |
| ⋮ | ⋮ | ⋮ |

MULTI-PHASE OUTER-TYPE PM STEPPING MOTOR

BACKGROUND OF THE INVENTION

1. Field of the invention

The present invention relates to a multi-phase outer-type permanent magnet PM stepping motor suitable for OA apparatus such as a printer, a high-speed facsimile equipment, a copying machine for normal paper, etc.

2. Description of the Related Art

Description will be made about a related-art outer-type PM stepping motor with reference to FIGS. 18A and 18B and FIG. 19.

FIG. 18A is a vertically sectional side view illustrating a configuration of a single-phase outer-type PM stepping motor 20 which is a first related-art example, and FIG. 18B is a partially cutaway perspective view of the same.

As shown in FIGS. 18A and 18B, this single-phase outer-type PM stepping motor 20 of the first related-art example is provided with a rotor 21 and a stator 23, and the rotor 21 has N (north) and S (south) magnetic poles formed alternately circumferentially on the inner circumferenitial surface.

Further, the stator 23 is disposed so that the outer circumferential surface of the stator 23 is opposite to the magnetic poles formed on the inner circumferential surface of the rotor 21 at a distance, and comb-like magnetic poles are formed in the stator 23.

In FIGS. 18A and 18E, the reference numeral 22 represents a rotating shaft; 24, a stator coil; 26, a motor mounting plate; and 27, a bearing.

FIG. 19 is a longitudinally sectional side view of a two-phase outer-type PM stepping motor 30 which is a second related-art example.

As shown in FIG. 19, this outer-type PM stepping motor 30 is also provided with a rotor 31 and a stator 33, and the stator 33 is constituted by first and second stator portions 33a and 33b stacked one on another in the axial direction.

In FIG. 19, the reference numeral 32 represents a rotating shaft; 34, a stator coil; 36, a motor mounting plate; and 37, a bearing.

The single-phase outer-type PM stepping motor of the first related-art example as mentioned above had only one stator. Therefore, in order to determine the rotating direction of the motor, magnetic permeance or phase between the pole teeth of the stator and the magnetic poles of the rotor was shifted, or a mechanical method was used. Accordingly, the related-art single-phase PM stepping motor was unsuitable for equipments while required high-speed rotation or high torque.

On tile other hand, according to the two-phase outer-type PM stepping motor of the second related-art example which was developed to solve these problems, torque and speed have been improved greatly, but the two-phase outer-type PM stepping motor has problems as follows.

(1) The number of lead wires for coils is large (i.e. at least four lead wires ), and it is necessary to use at least eight transistors in a driving circuit.
(2) A torque ripple is so large that vibration is large.
(3) When the step angle is made small, a large number of magnetic poles must be formed, causing a problem on machining.
(4) It is difficult to obtain high torque with a fine step angle.

It is an object of the present invention to provide a multi-pilase outer-type PM stepping motor in which tile foregoing problems can be solved.

SUMMARY OF THE INVENTION

In order to achieve the above object, according to a first aspect of the present invention, provided is a multi-phase outer-type PM stepping motor comprising: a rotor constituted by a cylindrical permanent magnet in which N (north) and S (south) poles are magnetized alternately on an inner circumferential surface of the rotor; stator cores respectively having pole teeth disposed in opposition to the N or S poles of the rotor through a predetermined gap; and excitation coils wound in the stator cores for magnetizing the stator cores to thereby rotate tile rotor; wherein when a number of the stator cores is 3 and a magnetization pitch of the permanent magnet is P, the pole teeth of the stator cores are arranged so that tile pole teeth of one stator core are shifted by an angle of 2P/3 from the pole teeth of an adjacent stator core.

According to a second aspect of the present invention, in tile above multi-phase outer-type PM stepping motor, three stator coils wound on the three stator cores respectively are connected to have three terminals, and two or three of the three stator coils are bipolar-driven simultaneously by a driving circuit constituted by six transistors.

According to a third aspect of tile present invention, in the above multi-phase outer-type PM stepping motor, three stator coils wound on the three stator cores respectively are connected to have six terminals, and two or three of the three stator coils are bipolar-driven simultaneously by a driving circuit constituted by twelve transistors.

According to a fourth aspect of the present invention, provided is a multi-phase outer-type PM stepping motor comprising: a rotor constituted by a cylindrical permanent magnet in which N (north) and S (south) poles are magnetized alternately on an inner circumferential surface of the rotor; stator cores respectively having pole teeth disposed in opposition to tile N or S poles of the rotor through a predetermined gap; and excitation coils wound in the stator cores for magnetizing the stator cores to thereby rotate the rotor; wherein when a number of the stator cores is n (n is an odd number not smaller than 3) and a magnetization pitch of the permanent magnet is P, the pole teeth of the stator cores are arranged so that the pole teeth of one stator core are shifted by an angle of 2P/n from the pole teeth of another stator core.

According to a fifth aspect of the present invention, provided is a multi-phase outer-type PM stepping motor comprising: three pairs of rotors and stators, each pair including a rotor constituted by a cylindrical permanent magnet in which N (north) and S (south) poles are magnetized alternately on an inner circumferential surface of the rotor, a stator core having pole teeth disposed in opposition to tile N or S poles of the rotor through a predetermined gap, and an excitation coil wound on the stator core for magnetizing the stator core to thereby rotate the rotor; wherein the three stator cores are stacked one on another in a three-ganged state at the same pitch, while a rotors are arranged in a manner so that, when the magnetization pitch of the permanent magnet is P, magnetic poles of a second rotor are shifted by 2P/3 from magnetic poles of a first rotor, and magnetic poles of a third rotor are shifted by 2P/3 from magnetic poles of the second rotor in the same manner.

According to a sixth aspect of the present invention, in the above multi-phase outer-type PM stepping motor, three stator coils wound on tile three stator cores respectively are connected to have three terminals, and two or three of the three stator coils are bipolar-driven simultaneously by a driving circuit constituted by six transistors.

According to a seventh aspect of tile present invention, in the above multi-phase outer-type PM stepping motor, three stator coils wound on the three stator cores respectively are connected to have six terminals, and two or three of tile three stator coils are bipolar-driven simultaneously by a driving circuit constituted by twelve transistors.

According to a eighth aspect of the present invention, provided is a multi-phase outer-type PM stepping motor comprising: n pairs of rotors and stators, each pair including a rotor constituted by a cylindrical permanent magnet in which N (north) and S (south) poles are magnetized alternately on an inner circumferential surface of the rotor, a stator core having pole teeth disposed in opposition to the N or S poles of the rotor through a predetermined gap, and an excitation coil wound on the stator core for magnetizing the stator core to thereby rotate the rotor; wherein the n stator cores are stacked one on another in n-ganged state at the same pitch, while the rotors are arranged in a manner so that, when a magnetization pitch of tile permanent magnet is P, magnetic poles of a second rotor are shifted by 2P/n from magnetic poles of a first rotor, and magnetic poles of a $n^{th}$ rotor are shifted by 2P/n from magnetic poles of the $n-1^{th}$ rotor in the same manner.

BRIEF DESCRIPTION OF THE DRAWINGS

FIG. 17 is a table showing the relationship among tile number of magnetic poles (M) of the rotor, the pitch of magnetic poles (τr) of the rotor, and the step angle (θs) in the three-pilase outer-type PM stepping motor according to the present invention;

DETAILED DESCRIPTION OF THE PREFERRED EMBODIMENTS

First Embodiment

First, a basic configuration of a first embodiment of the three-phase outer-type PM stepping motor according to the present invention will be described with reference to FIGS. 1 to 3.

Figure 1:
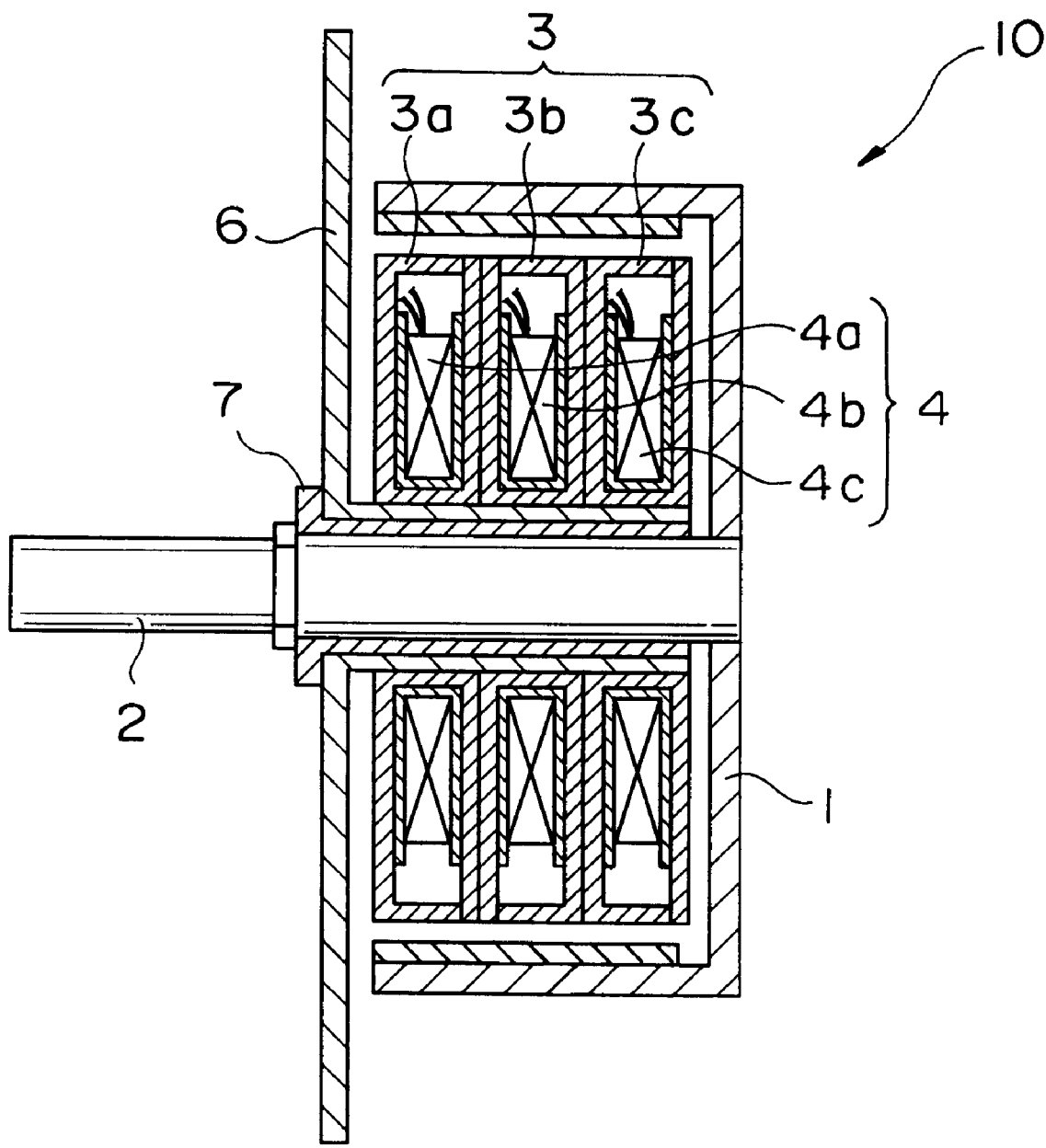
FIG. 1 is a vertically sectional side view illustrating a first embodiment of the three-phase outer-type PM stepping motor according to the present invention.
Figure 2:
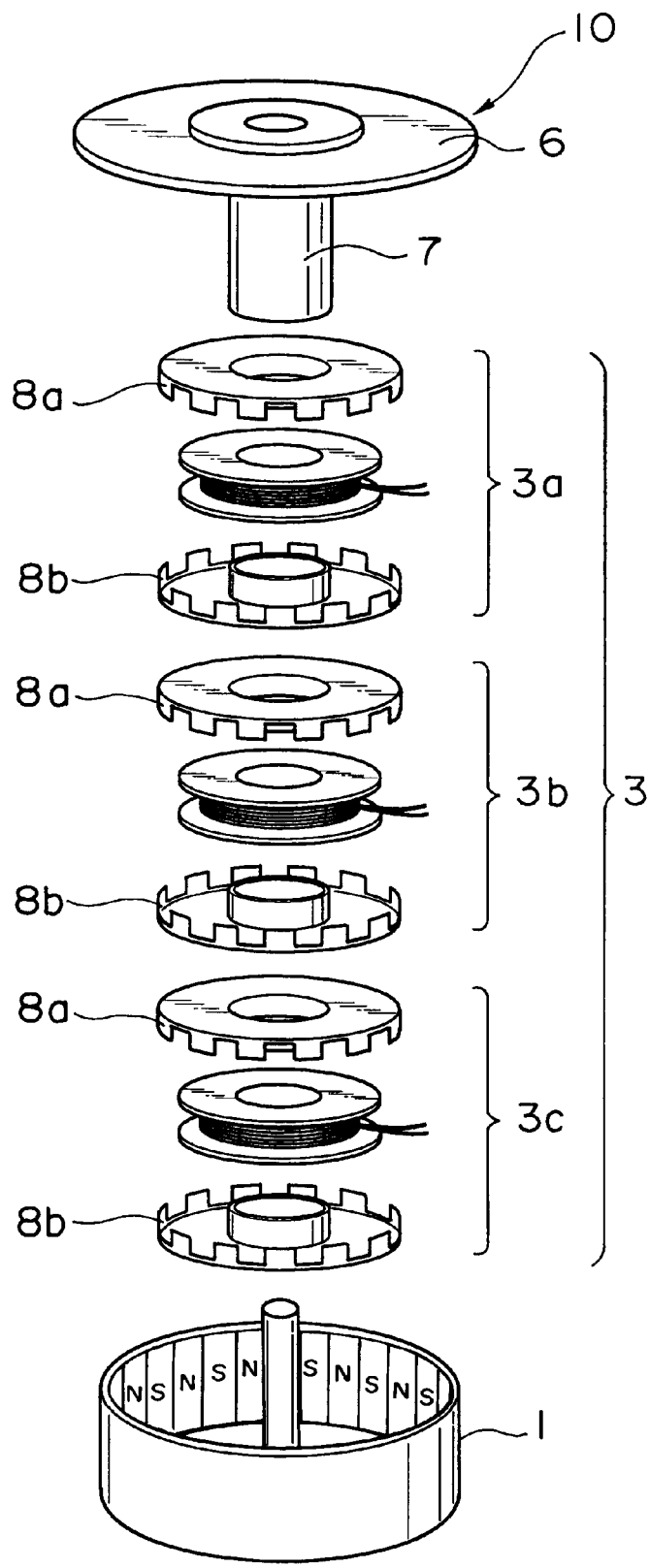
FIG. 2 is an exploded perspective view illustrating the three-phase outer-type PM stepping motor of the first embodiment.

FIG. 1 is a vertically sectional side view illustrating a first embodiment of the three-phase outer-type PM stepping motor 10 according to the present invention; and FIG. 2 is an exploded perspective view illustrating the three-phase outer-type PM stepping motor 10 of this embodiment.

Figure 3:
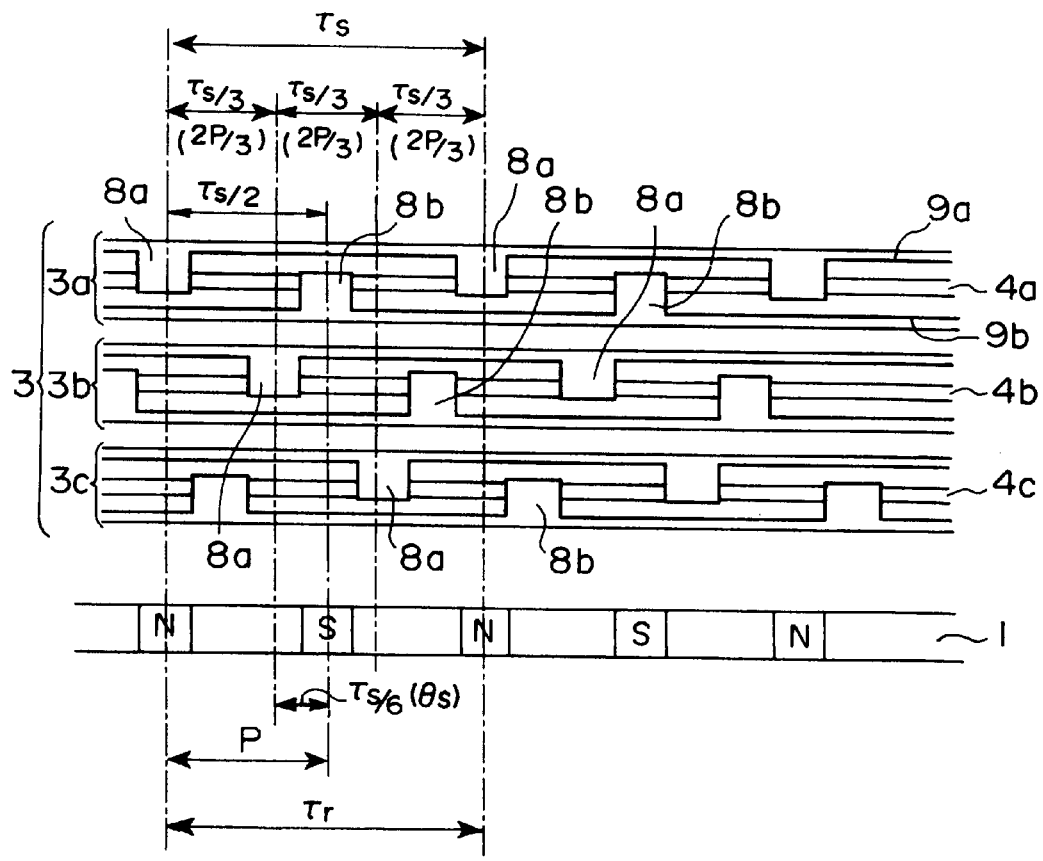
FIG. 3 is a development of stator portions and a rotor of the three-phase outer-type PM stepping motor of the first embodiment.

Further, FIG. 3 is a development of stator portions of a stator 3 and a rotor 1 of the stepping motor 10.

As shown in FIGS. 1 and 2, the three-phase outer-type PM stepping motor 10 shown in this embodiment has a rotor 1, a rotating shaft 2, a stator 3 and a stator coil 4. The reference numeral 6 represents a motor mounting plate; and 7, a bearing.

Further, as shown in FIGS. 1 and 2, the stator 3 is constituted by first to third, that is, three in total, stator portions 3a to 3c stacked one on another in the axial direction. The positional relationship between respective comb-like pole teeth 8a and 8b of these stator portions 3a to 3c and N and S magnetic poles formed on the inner circumferential surface of the rotor 1 are determined in such a manner as shown in FIGS. 2 and 3.

That is, when each of the respective teeth pitches of the pole teeth 8a on one side yoke element 9a and the pole teeth 8b on the other side yoke element 9b is made to be τs, the pole teeth 8b on the other side yoke element 9b are shifted by τs/2 from the pole teeth 8a on the one side yoke element 9b in one circumferential direction, in each of the stator portions 3a to 3c. Further, in the same manner, a first pole tooth 8a of the second stator portion 3b is shifted by τs/3 from a first pole tooth 8a of the first stator portion 3a, a first pole tooth 8a of the third stator portion 3c is shifted by τs/3 from the first pole tooth 8a of the second stator portion 3a, a second pole tooth 8a of the first stator portion 3a is shifted by τs/3 from the first pole tooth 8a of the third stator portion 3c, a second pole tooth 8a of the second stator portion 3b is shifted by τs/3 from the second pole teeth 8a of the first stator portion 3a, . . . , and so forth.

Further, when each of the respective pitches of the N poles and S poles of the rotor 1 is made to be τr, the relation of τr=τs is established. Accordingly, tile distance P between N and S poles adjacent to each other is designed to have a relation of P=τr/2.

In the above configuration, the operation of tile three-phase outer-type PM stepping motor 10 according to this embodiment will be described with reference to FIGS. 4 to 7.

Figure 4:
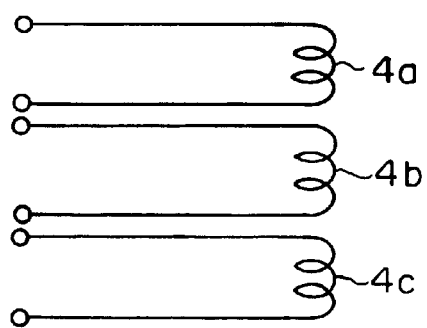
FIG. 4 is a diagram of coils for simply explaining the operation of the three-phase outer-type PM stepping motor according to the present invention.
Figure 5:
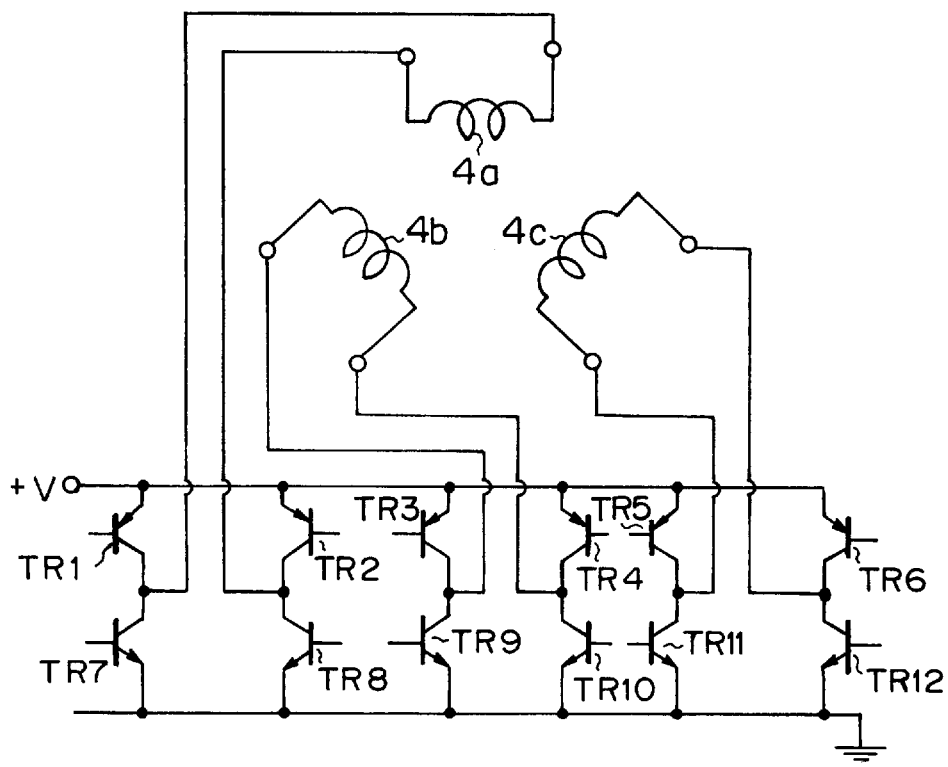
FIG. 5 is a driving circuit diagram of stator coils for simply explaining the operation of the three-phase outer-type PM stepping motor according to the present invention.
Figure 6:
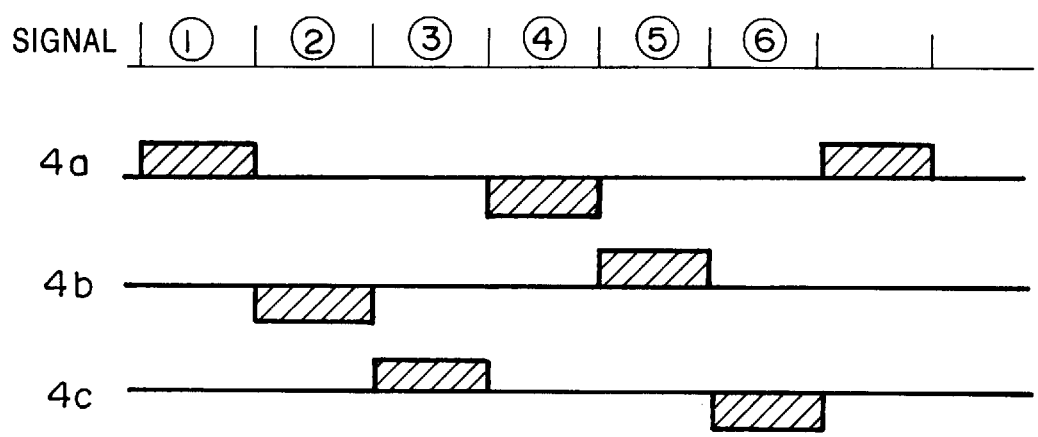
FIG. 6 is an excitation sequence diagram of the stator coils for simply explaining the operation of the three-phase outer-type PM stepping motor according to the present invention.

FIG. 4 shows monofilar-wound stator coils 4a to 4c and six external lead wires of the coils 4a to 4c in the three-phase outer-type PM stepping motor 10 according to this embodiment shown in FIG. 1. FIG. 5 is a diagram of a driving circuit for the stator coils 4a to 4c, using six PNP transistors TR1 to TR6 and six NPN transistors TR7 to TR12. FIG. 6 is a waveform diagram for simply explaining the operation of the three-phase outer-type PM stepping motor 10 according to this embodiment, when the stator coils 4a to 4c are bipolar-driven sequentially with excitation signals ① to ⑥ by use of the driving circuit in FIG. 5.

Figure 7:
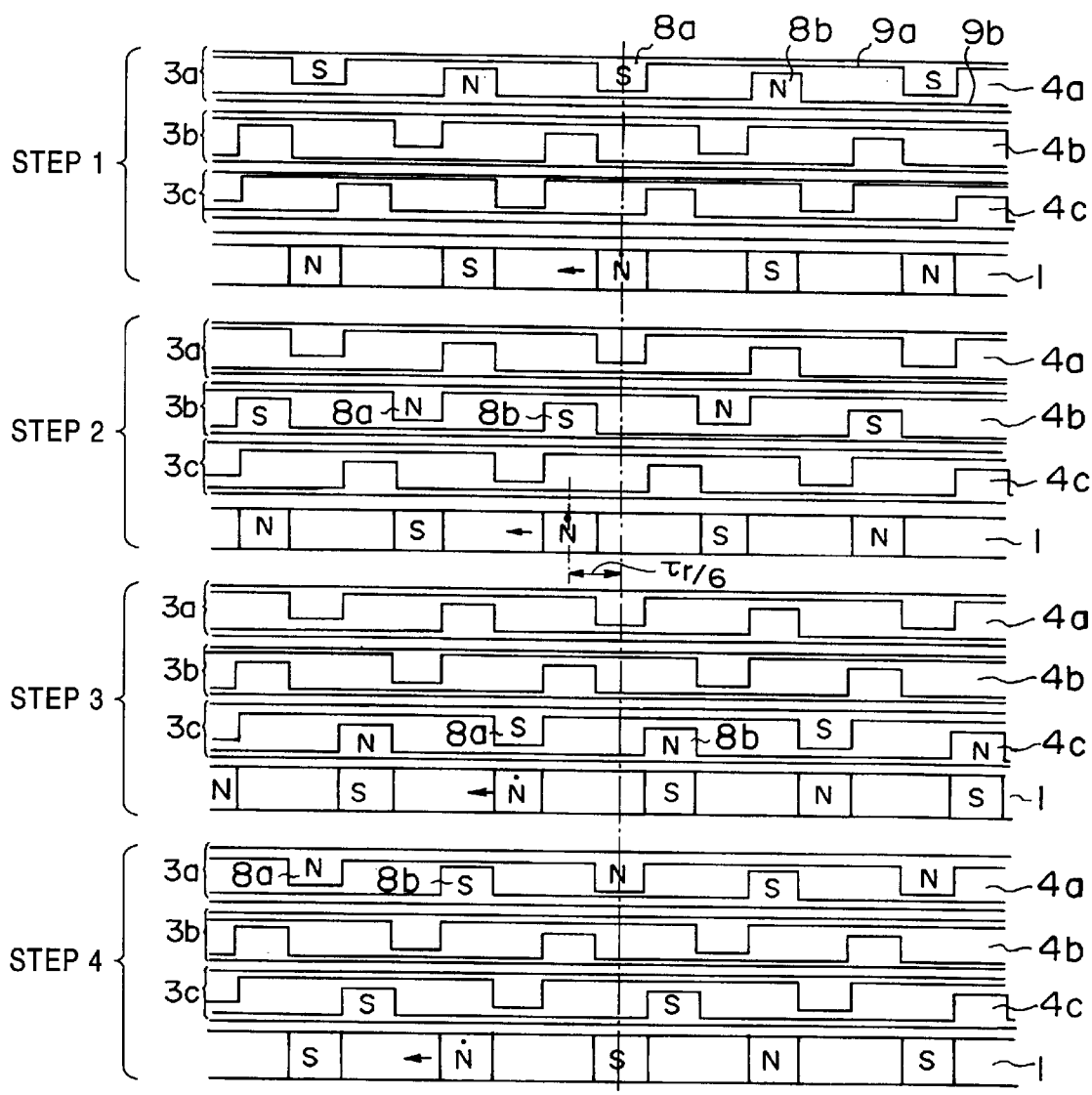
FIG. 7 is a development of pole teeth of the stator portions and magnetic poles of the rotor for simply explaining the operation of the three-phase outer-type PM stepping motor according to the first embodiment.

Further, FIG. 7 is a development of the pole teeth 8a and 8b of each of the stator portions 3a to 3c and the magnetic poles of the rotor 1 for simply explaining the operation of the three-phase outer-type PM stepping motor 10 according to this embodiment.

In Step 1 of FIG. 7, a current is supplied only to the stator coil 4a so that all the pole teeth 8a on one side of the first stator portion 3a are S while all the pole teeth 8b on the other side are N. In this case, the magnetic poles N of the rotor 1 are attracted to S of tile pole teeth 8a of the first stator portion 3a, while the magnetic poles S are attracted to N of the pole teeth 8b, so that the magnetic poles are arranged in such a position as shown in Step 1 of FIG. 7.

Next, in Step 2 of FIG. 7, a current is supplied to the stator coil 4b so that the pole teeth 8a on one side of the second stator portion 3b are N while the pole teeth 8b on the other side are S. In this case, the magnetic poles S and N of the rotor 1 are attracted to N of the pole teeth 8a of the second stator portion 3b, and S of the pole teeth 8b, respectively, so that the magnetic poles are moved so as to be arranged as illustrated. At this time, the magnetic poles of the rotor 1 is moved by τr/6.

Further, in Step 3 of FIG. 7, a current is supplied to the stator coil 4c so that the pole teeth 8a on one side of the third stator portion 3c are S while tile pole teeth 8b on tile other side are N. In this case, the magnetic poles S and N of the rotor 1 are attracted to N of the pole teeth 8b of the third stator portion 3c and S of the pole teeth 8a, respectively, so that the rotor 1 moves by one step so as to be arranged as illustrated.

Although only Steps 1–4 are shown in FIG. 7, Steps 5 and 6 (not shown) follow. The direction of a current to be supplied to the stator coils 4a to 4c in Steps 4, 5 and 6 is made reversed to that in Steps 1, 2 and 3, respectively.

In such a manner, the rotor 1 moves in the direction as shown by the arrow, and it returns in Step 7 to the position shown in Step 1. The step angle θs at this time is τr/6.

Next, tile specific operation of the three-phase outer-type PM stepping motor 10 according to this embodiment will be described with reference to FIGS. 8 to 11.

Figure 8:
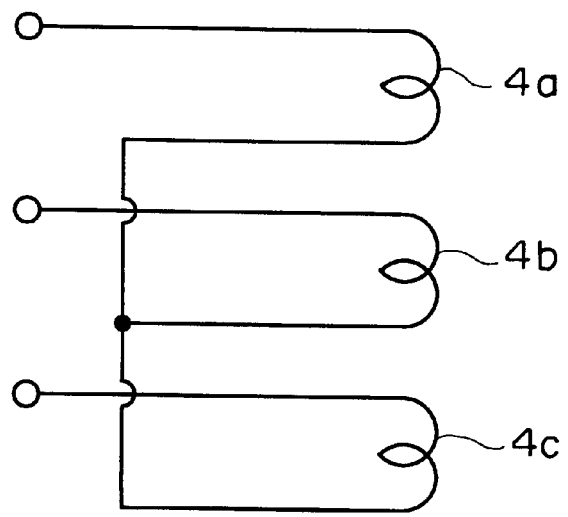
FIG. 8 is an explanatory diagram of the stator coils of the three-phase outer-type PM stepping motor according to the present invention.
Figure 9:
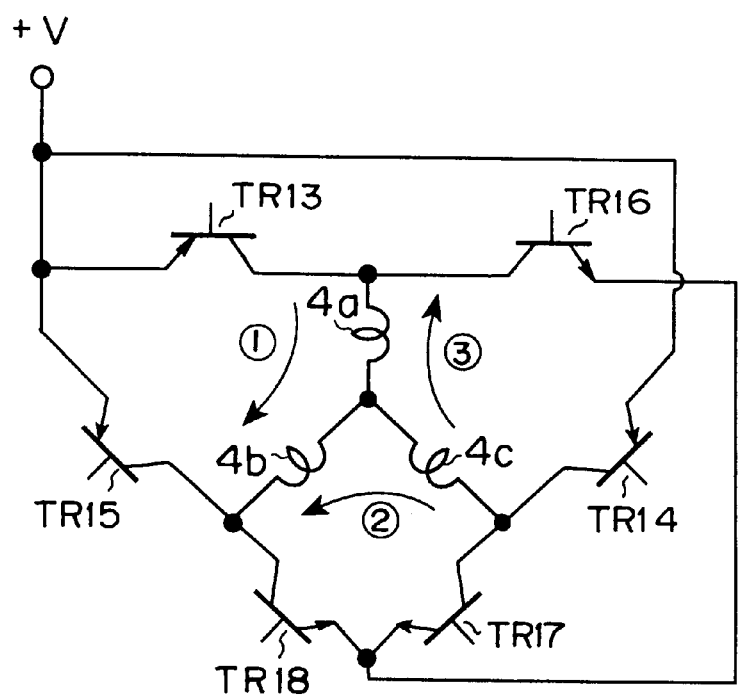
FIG. 9 is a driving circuit diagram of the stator coils of the three-phase outer-type PM stepping motor according to the present invention.
Figure 10:
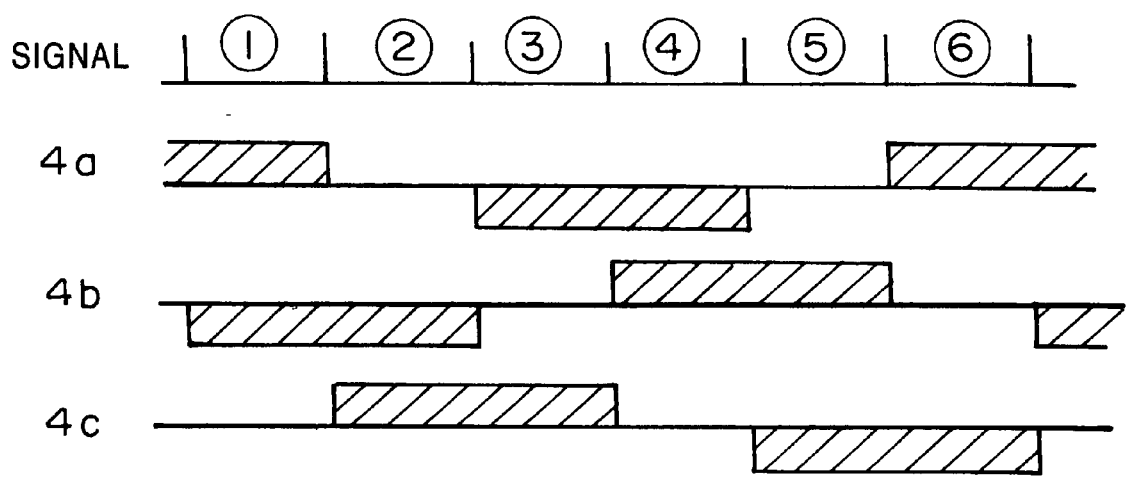
FIG. 10 is an excitation sequence diagram of the stator coils of the three-phase outer-type PM stepping motor according to the present invention.

Here, FIG. 8 is an explanatory diagram of the stator coils 4a, 4b and 4c of the three-phase outer-type PM stepping motor 10 according to this embodiment. FIG. 9 is a driving circuit diagram of the stator coils 4a to 4c. FIG. 10 is an excitation sequence diagram of tile stator coils 4a to 4c.

Figure 11:
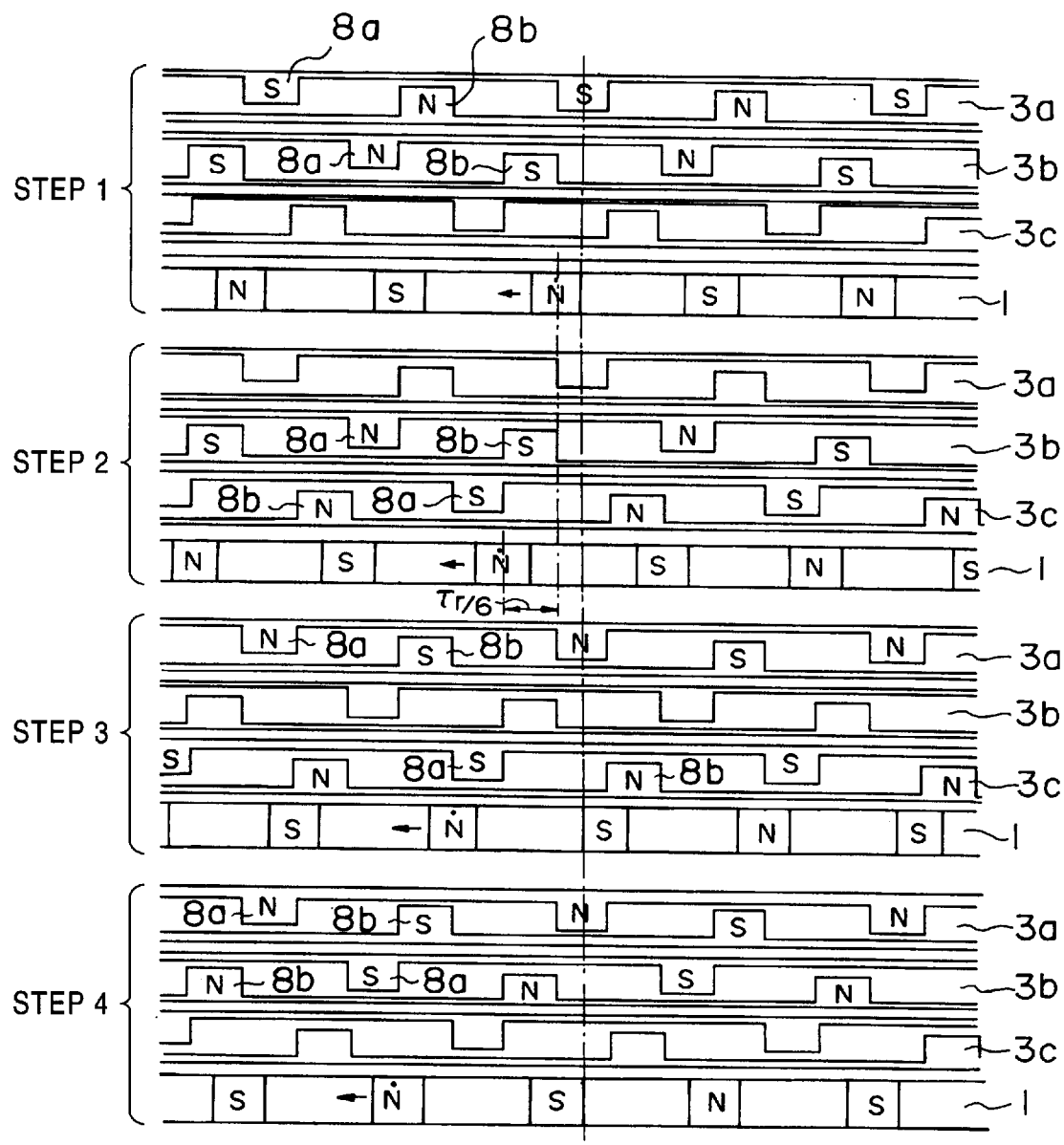
FIG. 11 is an development of pole teeth of the stator portions and magnetic poles of the rotor for simply explaining the operation of the three-phase outer-type PM stepping motor according to the present invention.

Further, FIG. 11 is a development of the pole teeth 8a and 8b of the stator portions 3a to 3c and the magnetic poles of the rotor 1 for simply explaining the operation of the three-phase outer-type PM stepping motor 10 according to this embodiment.

In this embodiment, as shown in FIG. 8, stator coils 4a to 4c are connected in a star-connection with three external lead wires. These lead wires are connected respectively between a pair of PNP and NPN transistors TR13 and TR16, a pair of PNP and NPN transistors TR15 and TR18 and a pair of PNP and NPN transistors TR14 and TR17 each pair being connected in series to a DC power supply. Excitation signals ① to ⑥ as shown in FIG. 10 are applied to this stator coil driving circuit so as to bipolar-drive the first to third stator coils 4a to 4c.

In this case, as shown in FIG. 11, in Step 1, all the pole teeth 8a on one side of the first stator portion 3a and all the pole teeth 8b on the other side of the second stator portion 3b are S while all the pole teeth 8b on the other side of the first stator portion 3a and all tile pole teeth 8a on one side of the second stator portion 3b are N. In Step 2, all the pole teeth 8a on one side of the second stator portion 3b and all the pole teeth 8b on the other side of the third stator portion 3c are N while all the pole teeth 8b on the other side of the second stator portion 3b and all the pole teeth 8a on one side of the third stator portion 3c are S. In Step 3, all the pole teeth 8a on one side of the third stator portion 3c and all the pole teeth 8b on the other side of the first stator portion 3a are S while all the pole teeth 8b on the other side of the third stator portion 3c and all the pole teeth 8a on one side of tile first stator portion 3a are N.

Although only Steps 1 to 4 are shown in FIG. 11, Steps 5 and 6 (not shown) follow. Tile direction of a current to be supplied to the stator coils 4a to 4c in Steps 4 to 6 is made reversed to that supplied in Steps 1 to 3, respectively, so that tile polarities N and S in the pole teeth 8a and 8b in each of the stator portions 3a to 3c in Steps 4 to 6 are made reversed to that in Steps 1 to 3.

In Step 7, the rotor 1 returns to the position shown in Step 1. The step angle θs at this time is τr/6.

Second Embodiment

A basic configuration of a second embodiment of the three-phase outer-type PM stepping motor according to the present invention will be described below with reference to FIGS. 12 to 14.

Figure 12:
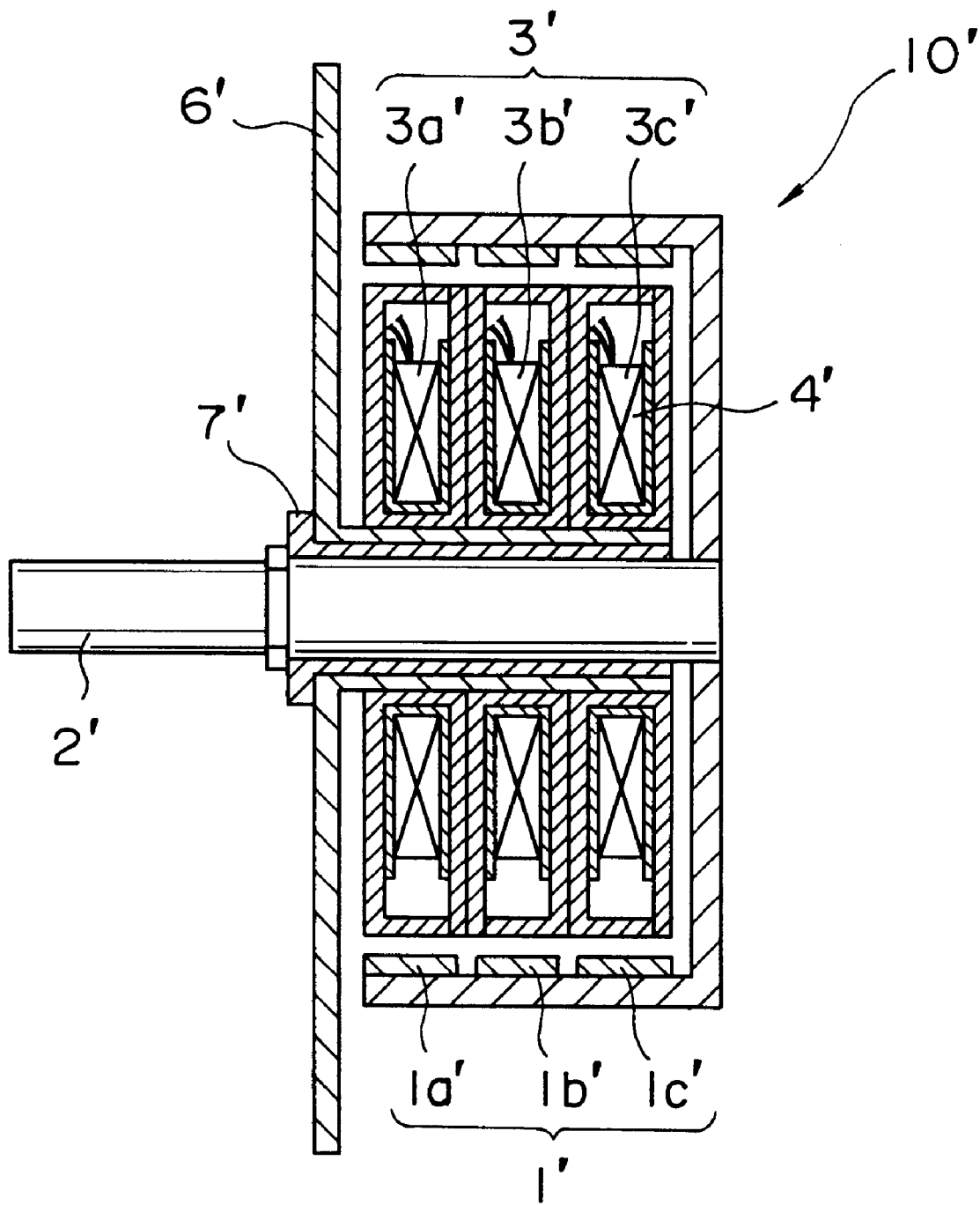
FIG. 12 is a vertically sectional side view illustrating a second embodiment of the three-phase outer-type PM stepping motor according to the present invention.
Figure 13:
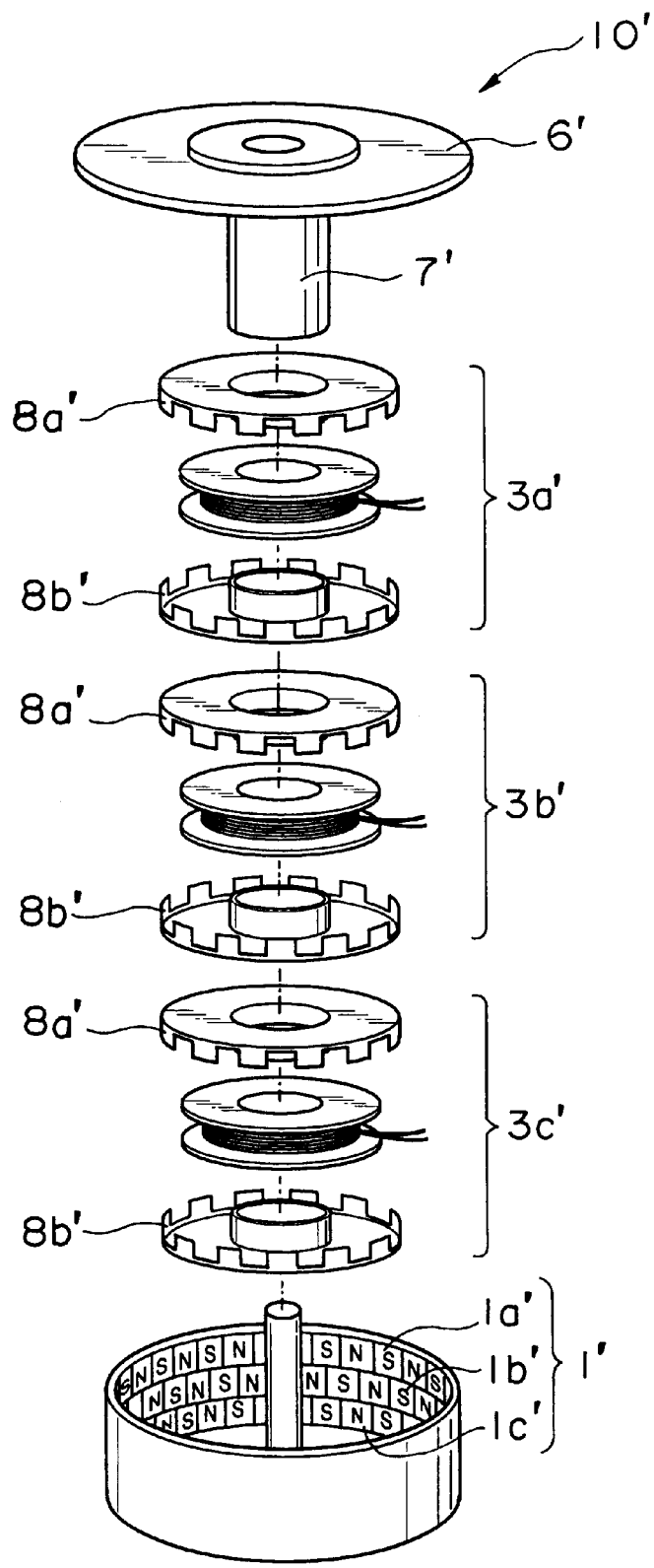
FIG. 13 is an exploded perspective view illustrating the three-phase outer-type PM stepping motor of the second embodiment.

FIG. 12 is a vertically sectional side view illustrating a second embodiment of the three-phase outer-type PM stepping motor 10' according to the present invention; and FIG. 13 is an exploded perspective view illustrating the three-phase outer-type PM stepping motor 10' of this embodiment.

Figure 14:
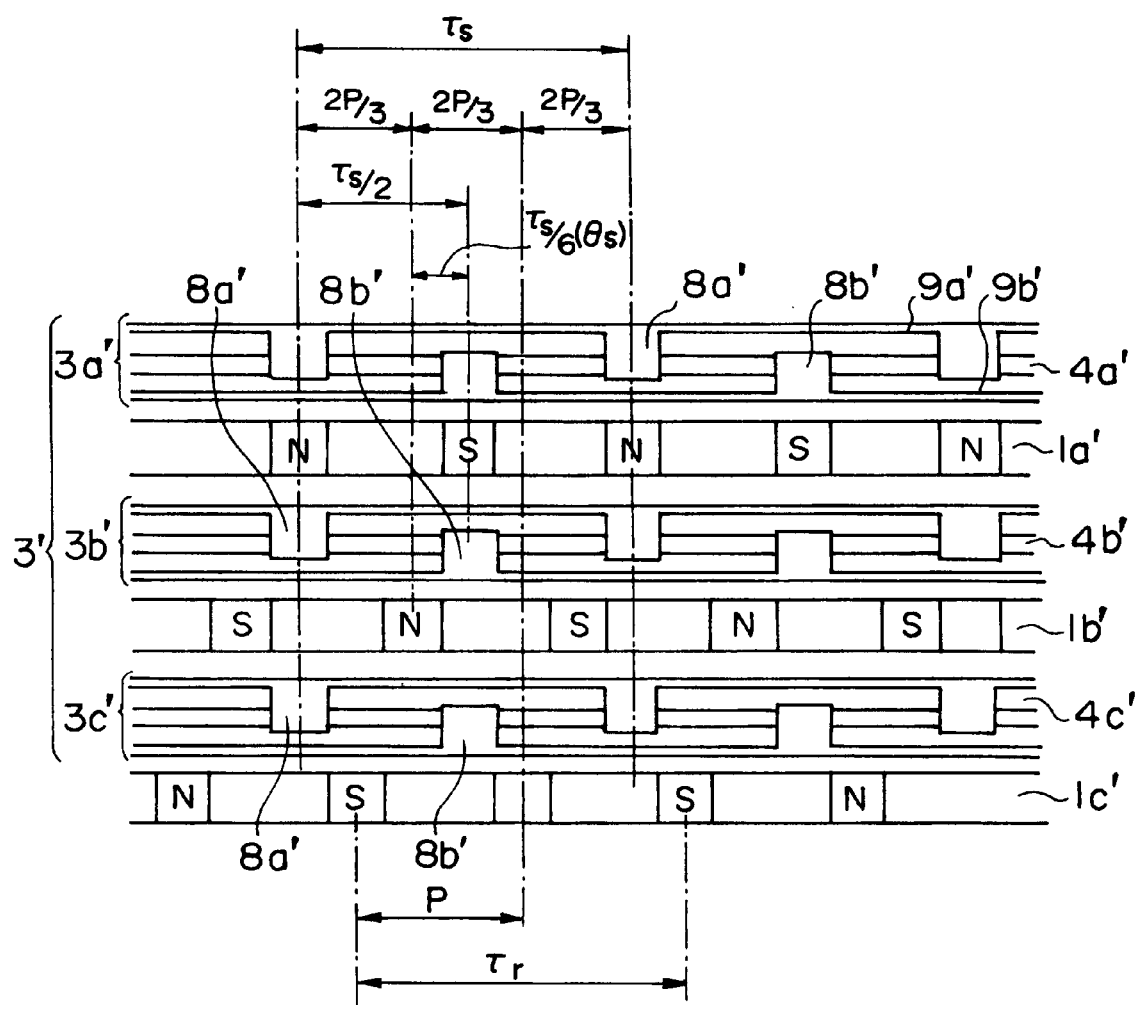
FIG. 14 is a development of stator portions and a rotor of the three-phase outer-type PM stepping motor according to the second embodiment.

Further, FIG. 14 is a development of stator portions of a stator 3' and a rotor 1' of the stepping motor 10'.

As shown in FIGS. 12 and 13, the three-phase outer-type PM stepping motor 10' shown in this embodiment has a rotor 1', a rotating shaft 2', a stator 3' and a stator coil 4'. In FIGS. 12 and 13, the reference numeral 6' represents a motor mounting plate; and 7', a bearing.

Further, the positional relationship between respective comb-like pole teeth 8a' and 8b' of first to third, three in total, stator portions 3a' to 3c' which are stacked one on another in the axial direction to constitute the stator 3', and N and S magnetic poles on the inner circumferential surface of first to third, three in total, rotor portions 1a' to 1c' constituting the rotor 1' are determined as shown in FIG. 14.

That is, when each of the respective pitches of the pole teeth 8a' and 8b' of one and the other yoke elements 9a' and 9b' is made to be τS, the pole teeth 8b' on the other side are shifted in one circumferential direction by τs/2 from the pole teeth 8a' on the one side in each of the first to third stator portions 3a' to 3c'. In such a manner, the first to third stator portions 3a' to 3c' are connected in three-ganging so that the pole teeth 8a' and 8b' are aligned as shown in FIG. 14.

Further, the rotor 1' in this embodiment is constituted by first to third rotor portions 1' a' to 1c' as shown in FIGS. 12 and 13. When each of the respective pitches of N poles and S poles is made to be τr, the relation of τr=τs is established. Accordingly, the distance P between N and S poles adjacent to each other is designed to have a relation of P=τr/2.

Further, the magnetic poles of the first rotor portion 1a' are shifted by an angle of 2P/3 from the magnetic poles of the second rotor portion 1b', and the magnetic poles of the second rotor portion 1b' are also shifted by an angle of 2P/3 from the magnetic poles of the third rotor portion 1c'.

In this embodiment shown in FIG. 12, the three stator portions are stacked one on another continuously at the same pitch. When the magnetization pitch angle of permanent magnet is P, the rotor 1' is configured so that the magnetic poles of the second rotor portion 1b' are shifted by 2P/3 from those of the first rotor portion 1a', and the magnetic poles of the third rotor portion 1c' are shifted by 2P/3 from those of the second rotor portion 1b' in the same manner.

Figure 15:
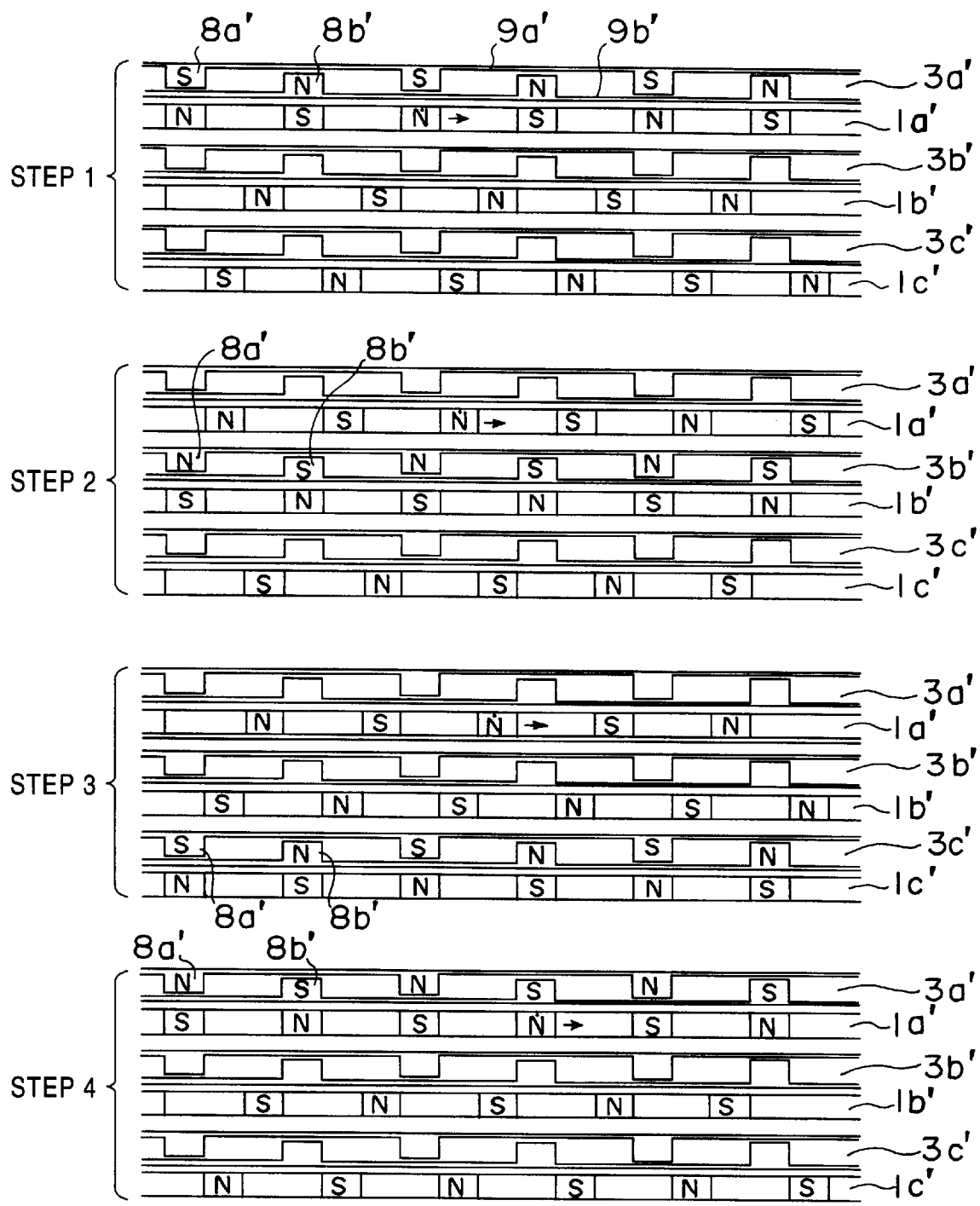
FIG. 15 is a development of pole teeth of the stator portions and magnetic poles of the rotor portions for simply explaining the operation of the three-phase outer-type PM stepping motor according to the second embodiment.

FIG. 15 shows the operation of the three-phase outer-type PM stepping motor 10 when the driving circuit in FIG. 5 is used for bipolar-driving the stator coils sequentially by the excitation signals shown in FIG. 6.

Figure 16:
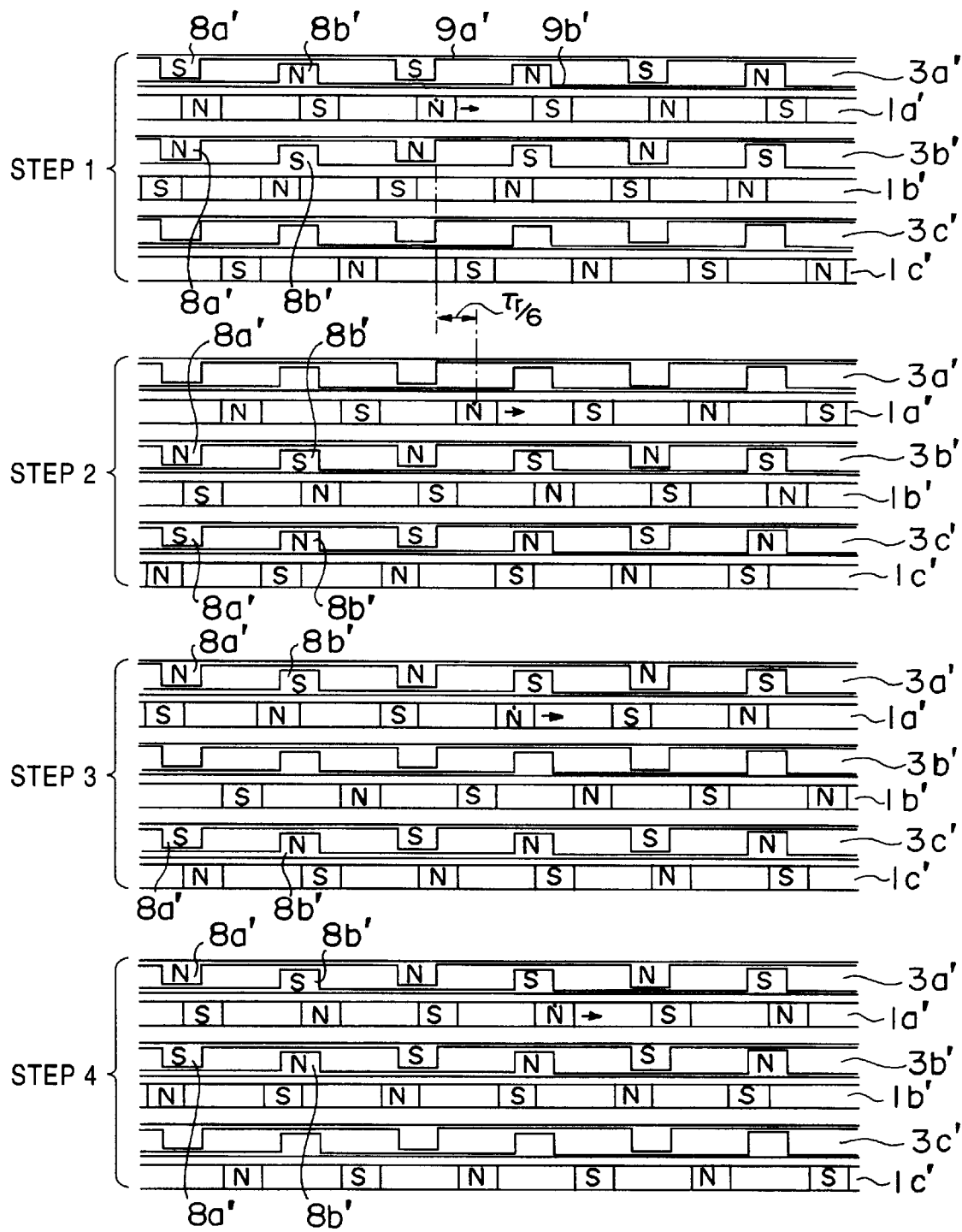
FIG. 16 is a development of pole teeth of the stator portions and magnetic poles of the rotor portions for simply explaining the operation of the three-phase outer-type PM stepping motor according to the second embodiment.
Figure 18A:
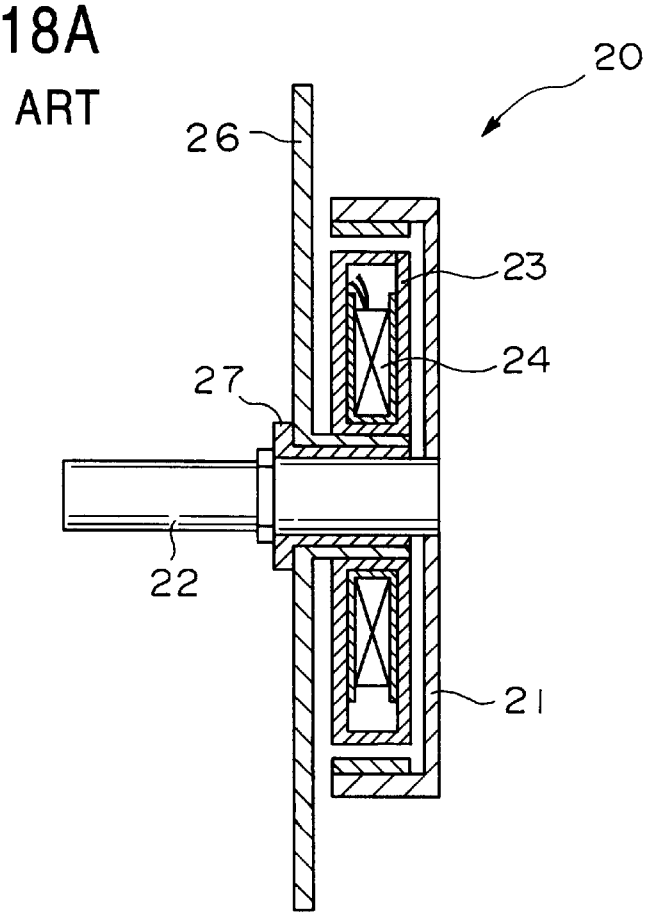
FIG. 18A is a vertically sectional view illustrating the configuration of a single-phase outer-type PM stepping motor which is a first related-art example.
Figure 18B:
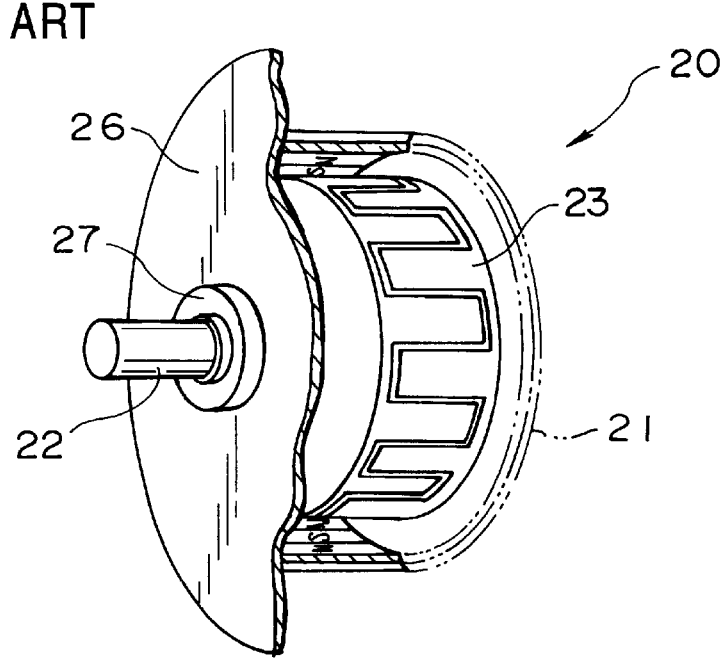
FIG. 18B is a partially cutaway perspective view of the same.
Figure 19:
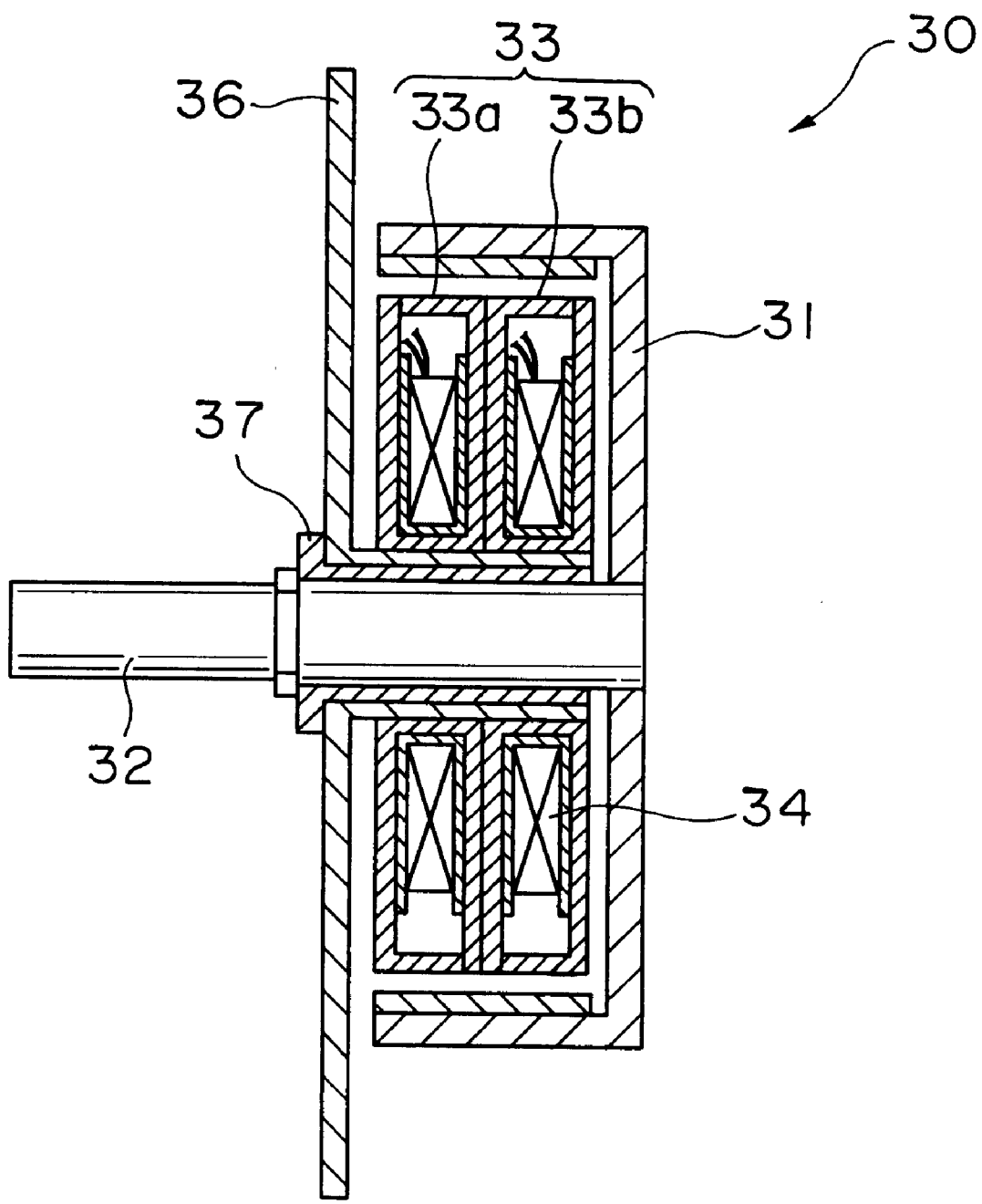
FIG. 19 is a vertically sectional side view illustrating a two-phase outer-type PM stepping motor which is a second related-art example.

FIG. 16 shows the operation of the three-phase outer-type PM stepping motor 10 when the driving circuit in FIG. 9 is used for bipolar-driving the stator coils sequentially by the excitation signals shown in FIG. 10.

Here, the operation of the three-phase outer-type PM stepping motor 10 in FIGS. 12 and 13 corresponds to that in FIG. 7 or FIG. 11 so that the description about that is omitted, and parts in FIGS. 15 and 16 similar to those in FIGS. 7 and 11 are referenced correspondingly with a dash put after the reference numerals.

The table of FIG. 17 shows the relationship among the number of magnetic poles M of the rotor 1 or the rotor 1', and the pitch of magnetic poles τr of the rotor 1 or the rotor 1' and the step angle θs of the rotor 1 or the rotor 1'.

In the aforementioned embodiments, description has been made about a three-phase outer-type PM stepping motor. In the case of an n-phase outer-type PM stepping motor (n is an odd number not smaller than 3), the magnetization pitch P of a rotor may be divided into not three but n, and pole teeth of stator portions may be arranged to be shifted by an angle of 2P/n.

A multi-phase outer-type PM stepping motor according to the present invention is configured as mentioned above. Accordingly, it has superior effects as follows.

(1) In order to obtain the same step angle, the magnetic pole width can be made wider than that in a two-phase outer-type PM stepping motor. Accordingly, the torque is improved by 20% or more in comparison with that in a related-art motor having the same shape.

(2) When the number of magnetic poles of a rotor is the same, it is possible to obtain a fine step angle in comparison with a two-phase outer-type PM stepping motor.

(3) At least four lead wires and eight transistors have been required for a driving circuit in a related-art two-phase outer-type PM stepping motor. On the other hand, according to the present invention, the number of lead wires can be reduced to three, and the number of large scale.

(4) If a position detecting means is provided, a multi-phase outer-type PM stepping motor according to the present invention can be used as a brushless motor.

(5) If the impedance of windings is changed, a multi-phase outer-type PM stepping motor according to the present invention can be used as a three-phase AC motor.

(6) A multi-phase outer-type PM stepping motor according to the present invention can be operated also in the case where the coils are connected in delta-connection.

What is claimed is:

1. A multi-phase outer-type PM stepping motor comprising:
    a rotor constituted by a cylindrical permanent magnet in which north N and south S poles are magnetized alternately on an inner circumferential surface of said rotor;
    stator cores respectively having pole teeth disposed in opposition to said N and S poles of said rotor through a predetermined gap; and
    excitation coils wound in said stator cores for uni-directionally magnetizing said stator cores to thereby rotate said rotor,
    wherein, when a number of said stator cores is 3 and a magnetization pitch of said permanent magnet is P, said pole teeth of said stator cores are arranged so that the pole teeth of one stator core are shifted by an angle of 2P/3 from the pole teeth of an adjacent stator core with a resultant step rotation of said motor by P/3.

2. A multi-phase outer-type PM stepping motor according to claim 1, wherein three stator coil is wound on said three stator cores respectively are connected to have three terminals, and two or three of said three stator coils are bipolar-driven simultaneously by a driving circuit constituted by six transistors.

3. A multi-phase outer-type PM stepping motor according to claim 1, wherein three stator coils wound on said three stator cores respectively are connected to have six terminals, and two or three of said three stator coils are bipolar-driven simultaneously by a driving circuit constituted by twelve transistors.

4. A multi-phase outer-type PM stepping motor comprising:
    a rotor constituted by a cylindrical permanent magnet in which north N and south S poles are magnetized alternately on an inner circumferential surface of said rotor;
    stator cores respectively having pole teeth disposed in opposition to said N and S poles of said rotor through a predetermined gap; and
    excitation coils wound in said stator cores for uni-directionally magnetizing said stator cores to thereby rotate said rotor,
    wherein, when a number n of said stator cores is an odd number not smaller than 3 and a magnetization pitch of said permanent magnet is P, said pole teeth of said stator cores are arranged so that the pole teeth of one stator core are shifted by an angle of 2P/n from the pole teeth of an adjacent stator core with a resultant step rotation of said motor by P/n.

5. A multi-phase outer-type PM stepping motor comprising:
    three pairs of rotors and stators, each pair including a rotor constituted by a cylindrical permanent magnet in which north N and south S poles are magnetized alternately on an inner circumferential surface of said rotor, a stator core having pole teeth disposed in opposition to said N and S poles of said rotor through a predetermined gap, and an excitation coil wound on said stator core for uni-directionally magnetizing said stator core to thereby rotate said rotor,
    wherein the three stator cores are stacked one on another in a three-ganged state at a same pitch, while said rotors are arranged in a manner so that, when a magnetization pitch of said permanent magnet is P, magnetic poles of a second rotor are shifted by 2P/3 from magnetic poles of a first rotor, and magnetic poles of a third rotor are shifted by 2P/3 from magnetic poles of the second rotor in the same manner with a resultant step rotation of said motor by P/3.

6. A multi-phase outer-type PM stepping motor according to claim 5, wherein three stator coils wound on said three stator cores respectively are connected to have three terminals, and two or three of said three stator coils are bipolar-driven simultaneously by a driving circuit constituted by six transistors.

7. A multi-phase outer-type PM stepping motor according to claim 5, wherein three stator coils wound on said three stator cores respectively are connected to have six terminals, and two or three of said three stator coils are bipolar-driven simultaneously by a driving circuit constituted by twelve transistors.

8. A multi-phase outer-type PM stepping motor comprising:

n pairs of rotors and stators, each pair including a rotor constituted by a cylindrical permanent magnet in which north N and south S poles are magnetized alternately on an inner circumferential surface of said rotor, a stator core having pole teeth disposed in opposition to said N and S poles of said rotor through a predetermined gap, and an excitation coil wound on said stator core for uni-directionally magnetizing said stator core to thereby rotate said rotor, wherein the n stator cores are stacked one on another in an n-ganged state at a same pitch, while said rotors are arranged in a manner so that, when a magnetization pitch of said permanent magnet is P, magnetic poles of a second rotor are shifted by 2P/n from magnetic poles of a first rotor, and magnetic poles of an $n^{th}$ rotor are shifted by 2P/n from magnetic poles of an $n^{th}$ rotor in the same manner with a resultant step rotation of said motor by P/n.

* * * * *